United States Patent Office 3,647,688
Patented Mar. 7, 1972

3,647,688
DEEMULSIFIERS FOR OIL-BASED EMULSIONS
James S. Morrison, Newark, Del., assignor to E. I. du Pont de Nemours and Company, Wilmington, Del.
No Drawing. Filed Jan. 24, 1969, Ser. No. 793,908
Int. Cl. C09k *3/00;* B01d *17/04*
U.S. Cl. 252—8.55 C  3 Claims

ABSTRACT OF THE DISCLOSURE

Propylene oxide adducts of fatty alcohol phosphates having the average formula $R_n(PO_4)[(C_3H_6OH)_{1.5}]_{3-n}$, with up to about 0.5 milliequivalent of acidity per gram of adduct as $R_n(PO_4)(-H)_{3-n}$, where R is $C_{8-20}$ alkyl and $n$ is 1–2; and Processes for resolving oil-brine and oil-hydrochloric acid emulsions by subjecting them to the action of these adducts.

---

This invention generally relates to the treatment of emulsions encountered in the production, handling and refining of crude mineral oil, for the purpose of separating the oil from water, brine and aqueous acidic material, especially to the use of the novel compositions of this invention in resolving emulsions of crude oil with hydrochloric acid or brine.

BACKGROUND

The history of most oil fields shows the gradual encroachment and infiltration of water into the oil-bearing horizons, and eventually the water becomes a part of the production from the wells regardless of the method of recovery. Water also may enter wells from source strata above or below the oil reservoir as a result of ineffective water shut-offs, corroded or leaky casing, or drilling into underlying water-bearing formations. Often water occurs in the oil sands or is separated from the oil zone by a parting so thin that the water cannot be excluded. Under the conditions of production the mechanical agitation of the water with the oil causes the dispersion of one liquid in the other to form emulsions that commonly are referred to as a "cut oil" in field practice. Estimates have shown that as much as one-third of the petroleum production comes to the surface in an emulsified form.

In conformity with the general theory of emulsions, the stability of petroleum emulsions depends upon the presence of a third substance called the emulsifying agent (emulsifier), which is soluble, dispersible, or wettable in or by the oil or the water. In general, the emulsifying material is considered to be present in the continuous phase of the emulsion.

Petroleum emulsions are in general of the water-in-oil type wherein the oil acts as a continuous phase for the dispersal of finely divided particles of naturally occurring waters or brines. These emulsions are often extremely stable and will not resolve on long standing. It is to be understood that water-in-oil emulsion may occur artificially resulting from any one or more of numerous operations encountered in various industries. The emulsions obtained from producing wells and from the bottom of crude oil storage tanks are commonly referred to as "cut oil," "emulsified oil," "bottom settlings," and "B.S."

One type of process involves subjecting an emulsion of the water-in-oil type to the action of a demulsifying agent of the kind hereinafter described, thereby causing the emulsion to resolve and stratify into its component parts of oil and water or brine after the emulsion has been allowed to stand in a relatively quiescent state.

Another type of process involves the use of a demulsifying agent of the kind hereinafter described in refinery desalting operations. In the refining of many crude oils a desalting operation is necessary in order to prevent the accumulation of large deposits of salt in the stills and to prevent corrosion resulting from the decomposition of such salts under high still temperatures. In a typical desalting installation 5% to 10% of fresh water is added to the crude oil charge stock and emulsified therein by means of a pump or through a differential pressure valve. A demulsifying agent is added and the treated oil permitted to stand in a quiescent state for relatively short periods of time allowing the salt-laden water to stratify, whereupon it is bled off to waste resulting in 90% to 98% removal of salt content. This operation is carried out continuously as contrasted with batch treating.

Petroleum emerging from wells subsequent to acid treatment of the well often contains acid emulsified in the oil. Such emulsions have proven very difficult to resolve with available emulsion breaking chemicals. It is particularly important, of course, to remove the corrosive acid from the oil before it can attack and damage pipes, tanks, pumps, drums and other metal equipment used to handle the petroleum product. Even more intractable problems have arisen with the use of strong hydrochloric acid (about 30%) in the treatment of wells. Emulsions of petroleum and such strong acids have proven very difficult to break.

It has now been found that emulsions of petroleum and brine or acid can be broken through the agency of certain propylene oxide adducts of fatty alcohol phosphates. The compositions of the type disclosed in the present invention show unusual utility in breaking emulsions of petroleum and hydrochloric acid of various strengths.

Early methods of treating crude oil emulsions are described in the United States Dept. of the Interior-Bureau of Mines Bulletin 417, published in 1939. U.S. Pat. No. 2,943,061 describes the resolving of oil in water emulsions using an ester of an organic carboxy acid and a polyoxyalkylene diol. Additional emulsion breaking compounds are disclosed in U.S. Pat. No. 3,042,625.

It is an object of this invention to provide a new composition of matter having unique emulsion breaking and preventing properties. Another objective is to provide a process and composition for breaking brine in oil emulsions. A further objective is to provide a process and composition for breaking emulsions of hydrochloric acid in petroleum.

BRIEF SUMMARY OF THE INVENTION (A) For use in breaking oil-hydrochloric acid and oil-brine emulsions, propylene oxide adducts of fatty alcohol phosphates of the average formula $$P_n(PO_4)[(C_3H_6OH)_{1.5}]_{3-n}$$

with up to 0.5 milliequivalent of acidity per gram of adduct as $R_n(PO_4)(-H)_{3-n}$, where R is an alkyl group of 8 to 20 carbon atoms and $n$ is 1–2, usually about 1.5; and (B) Processes for resolving oil-brine (containing about 5–15% by weight NaCl) and oil-hydrochloric acid (of about 7.5–31.0% strength) emulsions by subjecting them to the action of the above adducts.

DETAILED DESCRIPTION OF INVENTION

A great many chemicals have been used as emulsion breakers in the petroleum refining field. A feature shared by many of these materials is a duality of character wherein the molecule contains both a hydrophilic and an oleophilic part. Among these are the polyoxyalkylene diol esters of carboxy acids disclosed in U.S. Pat. No. 2,943,061, and similar mixed esters also containing phenol-formaldehyde condensation products as disclosed in U.S. Pat. No. 3,042,625. The compositions of this invention contrastingly involve phosphoric acid esters of $C_{8-20}$ fatty alcohols which are reacted with up to 3 moles of propylene oxide per mole of ester.

The phosphoric acid esters are preferably prepared by reacting 1 mole of phosphorous pentoxide with 3 moles of a $C_{8-20}$ fatty alcohol. The fatty alcohols used may be pure or commercial mixtures, straight, or branched chain, and of natural or synthetic origin. The most favored are those made from $C_{12}$ to $C_{18}$ alcohols, with little to choose between the straight chain and branched chain types. Propylene oxide is reacted with the above products until acidity in the reaction mixture has been reduced to about 0.2 milliequivalent per gram of adduct. This procedure leaves a very slight amount of residual unreacted phosphoric acidity, which is essential when the fatty alcohols used have less than 12 carbon atoms. When the fatty alcohol has 12 to 20 carbon atoms, the acidity may be completely neutralized to give a satisfactory product. When mixtures of alcohols are used involving compounds containing from 8 to 20 carbon atoms, from .1 to .5 milliequivalent of acidity are preferably maintained in the product.

In preparing the phosphate esters of the long chain fatty alcohols, the procedures disclosed in U.S. Pat. No. 2,005,619 may be used, phosphorous pentoxide ($P_2O_5$) being the favored esterifying agent. The procedure is well known, and may be used to esterify both pure alcohols and mixtures such as coconut oil and whale oil, or synthetic alcohols such as normal straight-chain alcohols of even-numbered carbon atoms or such as those derived in the "Alfol" process (see Kirk-Othmer Encyclopedia of Chem. Tech., vol. 14, p. 373, 2nd revised ed. 1967).

Propylene oxide is added to the long chain alcohol-phosphate ester mixture at 80±20° C., the reaction being exothermic at the beginning, and at pressures from atmospheric up to 40 p.s.i.g. Addition of propylene oxide is stopped when a sample indicates, by titration with standard caustic, the required amount of remaining acidity. The product is packaged and used without dilution or further treatment.

A large use for products of this type is found in the acid treatment of oil wells. Acid, usually hydrochloric acid, is put into an oil well to open up the geologic formation and increase the oil production. A discussion of acid treatment of oil wells may be found in an article by R. B. Newcombe in "The Oil Weekly" of May 29, 1933 (a Gulf Publishing Co. publication). The acid strength normally used in present processes is 15%, largely because the common corrosion inhibiting agents and emulsion preventing agents are not soluble in stronger acid. Since commercial hydrochloric acid is ordinarily sold as 30%–31% solution, this strength would be the most economical, as it could be used without dilution or extra handling in the field.

A particular advantage of the compositions of this invention is their relatively high solubility and dispersability in 30%–31% hydrochloric acid which thus greatly increases their practical value.

In addition to the requirement for usability in 30%–31% hydrochloric acid, a very desirable attribute for an emulsion preventer to be used in oil well treating is that it perform its function efficiently in wells or on oils from different locations. The properties of crude oil from different fields varies widely, and hitherto it has been necessary to provide a number of different emulsion breaking chemicals to be used in the different locations, each where experience has shown it to be sufficiently efficaceous. The products of this invention have been found to be almost universally useful as can be seen in the examples to follow. Testing with emulsions from many different oil fields has shown that these compounds effect prevention of emulsion formation in most all cases. Some emulsions are of course easier to break than others, but most of those tested succumbed to the emulsion breaking power of the inventive compositions in ten minutes or less.

When fatty alcohols of less than 8 or more than 20 carbon atoms are used to prepare phosphate esters with subsequent addition of propylene oxide, the products show less emulsion breaking power than the compositions of the invention, particularly in respect to their action on emulsions of crude oil and 30% hydrochloric acid. Likewise, compositions similar to those of the invention but prepared by adding ethylene oxide rather than propylene oxide to the alcohol-phosphate are apparently too hydrophilic, and do not have the same high degree of emulsion breaking properties.

A delicate balance of hydrophilic and oleophilic properties is required in order that the compositions have both the necessary emulsion breaking properties and the necessary dispersability in 30% hydrochloric acid. This is best attained by using a product in which one mole of phosphorous pentoxide is contacted with about 3 moles of fatty alcohol to give a produce of mixed mono and diphosphate ester which averages about 1½ moles of alkyl to 1 mole of phosphate. The amount of propylene oxide used is just sufficient to react with the remaining acidic groups of the phosphoric acid, or to have just a slight acidity as described above. Thus the preferred product is largely a mixture of substantially equal portions of

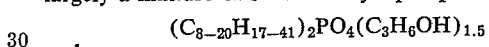

and

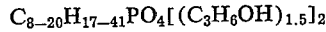

i.e., such that $n$ in the average formula is about 1.5.

In resolving hydrochloric acid-in-oil emulsions, wherein the acid is of about 7.5–31.0% strength, by subjecting it to the action of the deemulsifier, about 0.25–1.0 volume percent of the deemulsifier per volume of acid is employed. Preferably, the deemulsifier is preadmixed with the acid before it is added to the petroleum or oil well. In resolving brine-in-oil emulsions, about 0.50–2.0 volume percent of the deemulsifier per volume of brine is used. The brine may contain from about 5% to about 15% sodium chloride by weight.

EXAMPLES

Preparation of the compositions of the invention and their emulsion breaking properties are illustrated in the following examples, which are not intended to be limiting.

Example 1.—Preparation of $C_{12-16}$ phosphate-propylene oxide additive

The alcohol used was the commercial mixture sold as "Alfol" 1216. This product is a mixture containing about 60%–65% by weight $C_{12}$ saturated alcohol, 23%–27% of $C_{14}$ saturated alcohol and 9%–12% of $C_{16}$ saturated alcohol with small amounts of the similar $C_{10}$ and $C_{18}$ compounds.

The alcohol is charged to a dry, acid-resistant reactor and dry nitrogen bubbled through it at about 45° C., to remove any possible moisture. Phosphoric anhydride is added in increments of about 2.5% of the total to be used. The charge is continuously stirred at 50°±5° C. during the addition. About 36.5 moles of phosphoric anhydride are used for each 100 moles of alcohol. When all of the phosphoric anhydride has been added, the charge temperature is raised to 65°±2° C. and held for about 18 hours. It is cooled to 50° C., and packaged or transferred to other equipment for treatment with propylene oxide.

The alcohol phosphate product is treated with propylene oxide in a clean, dry, pressure-tight vessel with constant stirring. About 1½ moles of propylene oxide are reacted for each equivalent of acidity in the alcohol phosphate mixture. Alcohol phosphate is charged to the reactor and air is removed by evacuating with suction and releasing the vacuum with nitrogen. All the air must be removed. The reactor is closed, and propylene oxide is added, maintaining the reaction temperature at 60°–100° C. The reaction is exothermic, and jacket cooling is required. Normal pressure during the addition is 15 p.s.i.g., but pressures as high as 40 p.s.i.g. may be used. After all of the propylene oxide has been added, the charge is stirred for an additional hour at 90°–100° C. The charge is cooled to 35°±10° C. for packing.

The above procedure gives a product of approximate composition

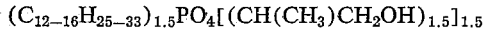
$(C_{12-16}H_{25-33})_{1.5}PO_4[(CH(CH_3)CH_2OH)_{1.5}]_{1.5}$ with a phosphoric acidity of about 0.13 milliequivalent per gram.

Example 2.—Testing of emulsion breaking properties

The following standard procedure is followed in testing for emulsion breaking properties:

(1) Place 50 ml. of hydrochloric acid (7.5%, 15% or 30%, as desired) in an 8 oz. bottle and add the desired amount of the deemulsifier to be tested. Mix with a stirring rod to dissolve the agent in the acid (this corresponds to the preferred method of use wherein the acid and deemulsifier are premixed or added simultaneously to an oil well).

(2) Add 50 ml. of untreated crude oil to the acid solution.

(3) Adjust the speed of a rapid mixer (here a Hamilton Beach, Model 33) to about 5000 revolutions per minute means of a Variac voltage controller and Strobotor.

(4) Mix the acid and oil at 5000 r.p.m. for one minute.

(5) Pour the contents of the bottle into a 100 ml. graduated cylinder and record total volume.

(6) Record the volume of acid (bottom layer) separating from the emulsion after 1 to 10 minutes. Note the general appearance of the emulsion.

(7) Calculate the percent acid breakout after the desired time interval, using the following equation:

$$\text{Percent acid breakout} = \frac{\text{vol. of acid separated} \times 100}{\frac{1}{2} \text{ of total volume in cylinder}}$$

Interpretation.—A good emulsion breaking agent will in most cases cause the emulsion prepared by this procedure to be 75–100% broken (normally 90–100%) in 10 minutes. The sides of the cylinder will be clean and free of oil. The acid phase will be clear and free of unbroken emulsion.

Performance of deemulsifier on various grades.—The deemulsifier of Example 1 was used at 3 different concentrations to treat petroleum —30% hydrochloric acid emulsions from representative petroleum sources, i.e., typical actual oil-bearing formations in the United States. Results are shown in Table I, where the concentration of deemulsifier is in volume percent based on the total volume of the emulsion.

TABLE I

[30% HCl-crude oil emulsions, percent break in 10 minutes]

| Crude oil source | Conc. of Ex. 1 deemulsifier, percent | | |
|---|---|---|---|
| | 0.5 | 0.25 | 0.125 |
| Ellenberger | 100 | 100 | 100 |
| Grayberg | 90 | 80 | 0 |
| Morrow | 100 | 100 | 100 |
| Penrose | 95 | 95 | 95 |
| San Andres | 85 | 75 | 50 |
| Travis Peak | 90 | 90 | 95 |
| Kenny Coastal | 80 | 85 | 70 |
| Tuscaloosa | 95 | 95 | 90 |
| Pauluxy | 100 | 95 | 90 |

Example 3.—Preparation of $C_{13}$ phosphate-propylene oxide additive

The alcohol used was commercial tridecyl alcohol. The procedure followed was the same as for Example 1 with the $C_{13}$ fatty alcohol substituted for the $C_{12-16}$ mixture. The resulting alcohol phosphate (propylene oxide additive) had the approximate average formula

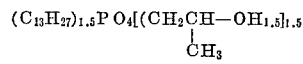
$(C_{13}H_{27})_{1.5}PO_4[(CH_2CH-OH_{1.5}]_{1.5}$
$\phantom{(C_{13}H_{27})_{1.5}PO_4[(CH_2}|$
$\phantom{(C_{13}H_{27})_{1.5}PO_4[(CH_2}CH_3$ with a phosphoric acidity of about 0.5 milliequivalent per gram. When this product was tested by the procedure of Example 2, the following results were obtained with emulsions prepared from crude oils from representative sources.

TABLE II

[30% HCl-crude oil emulsions, percent break in 10 minutes]

| Crude oil source | Conc. of Ex. 3 deemulsifier, percent | |
|---|---|---|
| | 0.5 | 0.25 |
| Ellenberger | 100 | 100 |
| Grayberg | 95 | 0 |
| Morrow | 100 | 95 |
| Penrose | 95 | 90 |
| San Andres | 80 | 50 |
| Travis Peak | 100 | 100 |
| Kenny Coastal | 90 | 90 |
| Tuscaloosa | 95 | 90 |
| Pauluxy | 90 | 95 |

Example 4.—Preparation of $C_{10}$ phosphate-propylene oxide additive

The procedure of Example 1 was repeated using commercial decyl alcohol in place of the $C_{12-16}$ alcohol used in that example. The resulting alcohol phosphate-propylene oxide additive had the approximate average formula

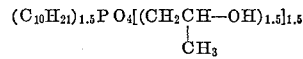
$(C_{10}H_{21})_{1.5}PO_4[(CH_2CH-OH)_{1.5}]_{1.5}$
$\phantom{(C_{10}H_{21})_{1.5}PO_4[(CH_2}|$
$\phantom{(C_{10}H_{21})_{1.5}PO_4[(CH_2}CH_3$ with slight remaining acidity. When this product was teste dby the procedure of Example 2, the following results were obtained, using emulsions prepared from crude oil from representative sources.

TABLE III.—30% HCl-crude oil emulsions, percent break in 10 minutes

| Crude oil source: | Conc. of Ex. 4 deemulsifier, percent 0.5 |
|---|---|
| Ellenberger | 95 |
| Grayberg | 95 |
| Morrow | 95 |
| Penrose | 100 |
| San Andres | 90 |
| Travis Peak | 95 |
| Kenny Coastal | 80 |
| Tuscaloosa | 95 |
| Pauluxy | 95 |

Example 5.—Preparation of $C_{16}$ phosphate-propylene oxide additive

The procedure of Example 1 was repeated using commercial cetyl alcohol in the place of the $C_{12-16}$ alcohol used in that example. The resulting alcohol phosphate-propylene oxide additive had the approximate average formula

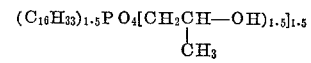
$(C_{16}H_{33})_{1.5}PO_4[CH_2CH-OH)_{1.5}]_{1.5}$
$\phantom{(C_{16}H_{33})_{1.5}PO_4[CH_2}|$
$\phantom{(C_{16}H_{33})_{1.5}PO_4[CH_2}CH_3$ with a residual acidity of 0.13 milliequivalent per gram. When this product was tested by the procedure of Example 2, the following results were obtained.

TABLE IV
[30% HCl-candle oil emulsions, present break in 10 minutes]

| Crude oil source | Conc. of Ex. 5 demulsifier, percent | | |
|---|---|---|---|
| | 0.5 | 0.25 | 0.125 |
| Ellenberger | 100 | 100 | 100 |
| Grayberg | 85 | 20 | 0 |
| Morrow | 95 | 95 | 95 |
| Penroso | 95 | 90 | 55 |
| San Andres | 85 | 80 | 80 |
| Travis Peak | 100 | 100 | 95 |
| Kenny Coastal | 85 | 75 | 75 |
| Tuscaloosa | 95 | 95 | 70 |
| Pauluxy | 85 | 85 | 90 |

Example 5.—Comparison of various strengths of HCl

As shown in Table V below, tests were run with four different deemulsifiers (A, B, C and D) to show their use in breaking acid-oil emulsions having different strengths of HCl (7.5, 15 and 30%).

The deemulsifiers were:

A—$(C_{16}H_{33})_{1.5}PO_4[C_3H_6OH]_{1.5}]_{1.5}$
B—Deemulsifier of Example 3
C—Deemulsifier of Example 1
D—Deemulsifier of Example 4

TABLE V

[Percent break in 10 min. using 0.5% deemulsifier]

| | Deemulsifier | | | | | | | | | | | |
|---|---|---|---|---|---|---|---|---|---|---|---|---|
| | A | | | B | | | C | | | D | | |
| Percent HCl | 7.5 | 15 | 30 | 7.5 | 15 | 30 | 7.5 | 15 | 30 | 7.5 | 15 | 30 |
| Grayberg | 90 | 95 | 85 | 95 | 95 | 95 | 95 | 95 | 90 | 95 | 95 | 75 |
| Morrow | 95 | 95 | 95 | 95 | 95 | 100 | 55 | 95 | 100 | 95 | 95 | 100 |
| San Andres | 90 | 95 | 85 | 95 | 95 | 80 | 95 | 95 | 85 | 100 | 95 | 80 |
| Kenny Coastal | | | 85 | 95 | 95 | 90 | 95 | 100 | 80 | 100 | 90 | 80 |
| Tuscaloosa | 95 | 90 | 95 | 95 | 95 | 95 | 70 | 60 | 95 | 95 | 95 | 90 |
| Pauluxy | 45 | 0 | 85 | 20 | 60 | 90 | 55 | 60 | 100 | 80 | 70 | 90 |
| Tensleep | 85 | 20 | 90 | 90 | 90 | 95 | 30 | 90 | 85 | 90 | 90 | 0 |
| Pennsylvania | 90 | 90 | 70 | 95 | 95 | 95 | 95 | 95 | 60 | 100 | 90 | 90 |
| Cleveland | 95 | 95 | 95 | 95 | 95 | 100 | 95 | 100 | 100 | 95 | 95 | 95 |

Example 7.—Brine-oil emulsions (A) A mixture was prepared of 50 ml. Morrow Crude Oil, 50 ml. of 7.5% by weight NaCl (sodium chloride) in water solution and 0.5 ml. of the deemulsifier of Example 4. The mixture was blended at 5000 r.p.m. for 1 minute. The emulsion exhibited 100% breakage after 1 minute settling.

(B) When the test was repeated with the substitution of Pauluxy Crude Oil, the emulsion exhibited 90% breakage after 1.5 and 10 minutes.

The foregoing detailed description has been given for clearness of understanding only, and no unnecessary limitations are to be understood therefrom. The invention is not limited to the exact details shown and described, for obvious modification will occur to those skilled in the art.

What is claimed is:

1. A process for breaking hydrochloric acid-oil emulsions wherein the emulsion is an acid-in-oil type, the hydrochloric acid being of about 7.5–31.0% strength, which comprises mixing the emulsion with about 0.25–1.0 volume percent, based on the volume of hydrochloric acid, of propylene oxide adducts of $C_{8-20}$ fatty alcohol phosphates having the average formula $$R_n(PO_4)[(C_3H_6OH)_{1.5}]_{3-n}$$

with up to about 0.5 milliequivalent of acidity per gram of adduct as

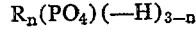

$$R_n(PO_4)(-H)_{3-n}$$

wherein R is an alkyl group of 8–20 carbon atoms and $n$ is about 1.5.

2. A process for breaking brine-oil emulsions wherein the emulsion is a water-in-oil type, the brine containing about 5–15% by weight of sodium chloride, which comprises mixing the emulsion with about 0.50–2.0 volume percent, based on the volume of brine, of propylene oxide adducts of $C_{8-20}$ fatty alcohol phosphates having the average formula $$R_n(PO_4)[(C_3H_6OH)_{1.5}]_{3-n}$$

with up to about 0.5 milliequivalent of acidity per gram of adduct as $$R_n(PO_4)(-H)_{3-n}$$

wherein R is an alkyl group of 8–20 carbon atoms and $n$ is about 1.5.

3. A process for preventing the formation of stable acid in oil emulsions in oil wells treated with hydrochloric acid of 7.5–31.0% strength, which comprises adding to the oil well, along with said acid, about 0.25–1.0 volume percent, based on the volume of acid, of propylene oxide adducts of $C_{8-20}$ fatty alcohol phosphates having the average formula $$R_n(PO_4)[(C_3H_6OH)_{1.5}]_{3-n}$$

with up to about 0.5 milliequivalent of acidity per gram of adduct as $$R_n(PO_4)(-H)_{3-n}$$

wherein R is an alkyl group of 8–20 carbon atoms and $n$ is about 1.5.

References Cited

UNITED STATES PATENTS

| 2,307,058 | 1/1943 | Moeller | 252—331 X |
| 2,314,022 | 3/1943 | Stone | 252—8.55 C |
| 2,586,897 | 2/1952 | Woodstock | 252—135 |
| 2,754,271 | 7/1956 | Kirkpatrick | 252—331 |
| 3,033,889 | 5/1962 | Chiddix et al. | 260—461 |
| 3,091,589 | 5/1963 | Brukner | 260—953 X |

OTHER REFERENCES

Zimmerman et al., Handbook of Trade Names, 1953 edition, p. 604.

HERBERT B. GUYNN, Primary Examiner

H. A. PITLICK, Assistant Examiner

U.S. Cl. X.R.

252—331; 260—953